April 23, 1935.  L. W. BAUER ET AL  1,999,075
STRAIN GAUGE
Filed March 11, 1932
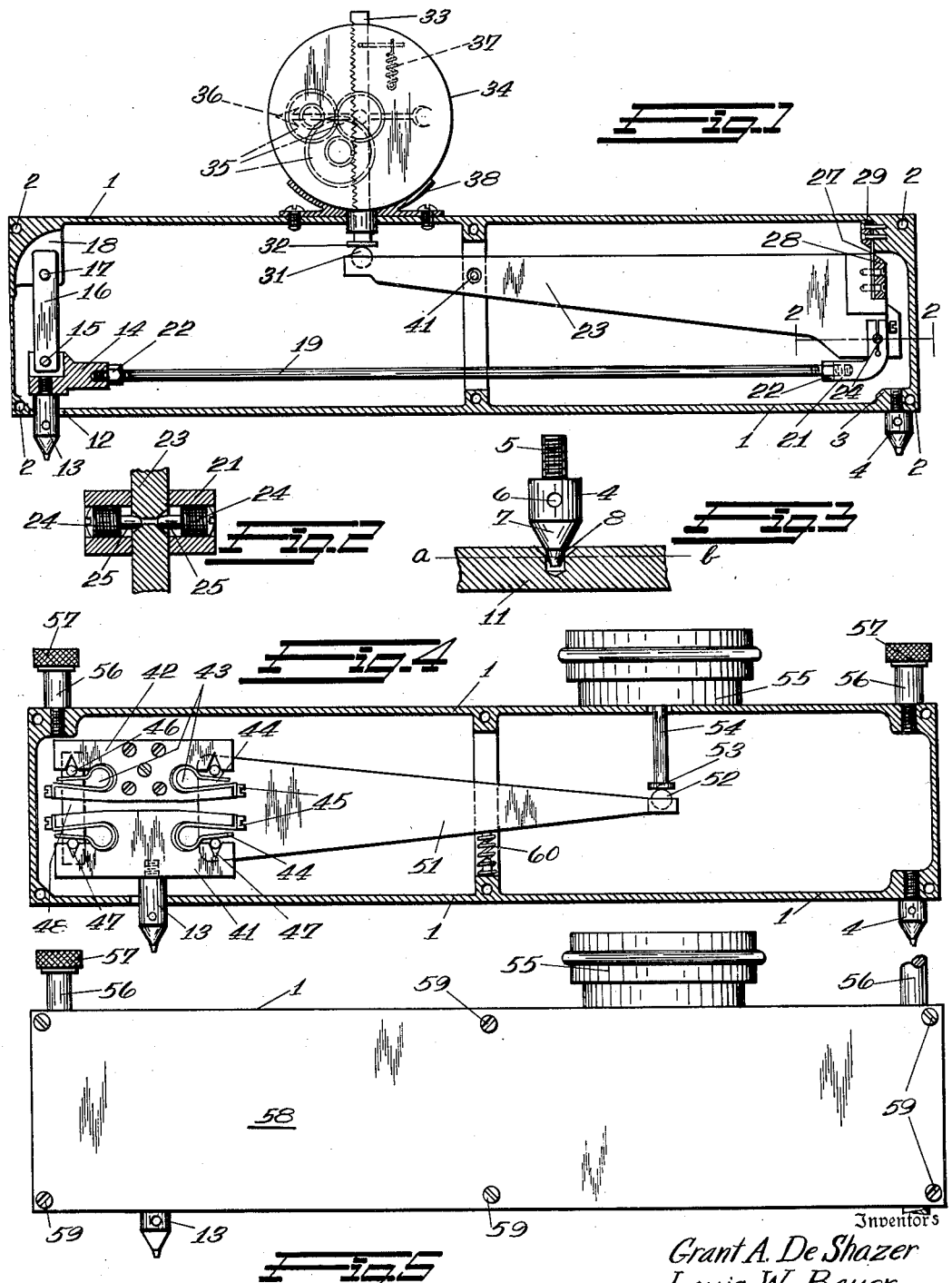
Inventors
Grant A. De Shazer
Louis W. Bauer
Strauch & Hoffman
Attorneys Patented Apr. 23, 1935

1,999,075

UNITED STATES PATENT OFFICE 1,999,075

STRAIN GAUGE

Louis W. Bauer and Grant A. De Shazer, Washington, D. C.

Application March 11, 1932, Serial No. 598,236

10 Claims. (Cl. 33—147)

This invention relates to a strain gauge adapted to measure the changes in shape in structural members when these members are put under load. By an accurate measurement of the contraction or elongation of a structural member, it is possible to thereby measure the stress set up in the member under a predetermined load.

One object of the present invention is to provide a strain gauge which is extremely accurate in measuring small changes in length and which may be readily used by inexperienced operators with slight chance of error.

Another object of the present invention is to provide a strain gauge embodying two parts movable relative to one another due to a change in shape of the member being tested, the two parts being constrained to move parallel to one another, and the relative movement thereof being multiplied within the gauge.

Another object of the present invention is to provide a strain gauge having two points adapted to be engaged in holes in a specimen under test, the points being so arranged that they are connected with a parallel motion device constraining the points to move parallel one to the other, the motion thereof being amplified within the gauge a predetermined amount and amplified further in an indicating instrument associated with the strain gauge.

A further object of the present invention is to provide novel points for use with strain gauges which are adapted to be engaged in holes in the specimen under test, the points being so constructed that a line contact is obtained with the specimen, whereby relatively inexperienced operators may use the gauge and obtain accurate results, since the points may not be engaged in the specimen in various angular positions to change the reading of the gauge.

A further object of the present invention is to provide a strain gauge of the type wherein a change of length between two points engaged by relatively movable elements of the gauge is reflected in the reading of the indicator of the gauge, the engagement between the movable part of the gauge, and the indicator being so arranged that the indicator accurately reflects the gauge movement of the relatively movable element in all positions thereof, thus eliminating errors due to the relative angularity of the parts. More specifically, this object is accomplished by the provision of a spherical surface on the movable part of the gauge directly engaging a smooth flat surface on the plunger of the instrument, whereby all movements of the lever carrying the spherical member are accurately reflected in the instrument.

Another object of this invention is to provide a strain gauge which is rugged in construction, simple in operation, and wherein all of the parts are housed in a dust-proof casing such that accurate reading of the instrument may be obtained over long periods of use.

These and various other objects of the invention will be apparent from the following description and appended claims when taken in connection with the accompanying drawing wherein Figure 1 is a longitudinal section through the preferred embodiment of the invention.

Figure 2 is a detailed section taken on line 2—2 of Figure 1.

Figure 3 is an elevation of one of the gauge points engaged with a hole in a test member.

Figure 4 is a sectional view of another embodiment of the invention.

Figure 5 is a front elevation of the modification shown in Figure 4 with the cover in position.

Referring to the drawing wherein like characters indicate like parts, the strain gauge of Figures 1 to 3 includes a substantially rectangular hollow casing 1 having an open side. This open side is adapted to be closed by a flat cover secured in position by machine screws engaging in openings 2 in corner lugs of the casing 1. The casing 1 is preferably milled from a solid piece of medium steel in the shape shown and together with the cover functions as an enclosing housing for the movable mechanism of the gauge. However, it will be understood that the housing 1 may be assembled from a plurality of parts, although the unitary casing is preferred. Adjacent one end of the casing 1 a lug 3 is provided with an accurately threaded opening to receive the fixed point 4.

This point, as well as the movable point hereinafter described is shown in detail in Figure 3, and includes a carefully threaded rod 5 which is adapted for engagement in the threaded hole in the lug 3. The body of the point 4 is provided with a hole 6 for reception of a rod for assembling or disassembling the points. The lower portion of the point 4 has a conical portion 7 terminating at its lower end in another conical portion 8. It will be noted from Figure 3 that the cone point 8 is cut at a less sharp angle than cone portion 7, and the part 8 is flattened at its outer end. As seen in Figure 3, this construction of the points results in a line contact with the hole in the member being tested. This line of contact is designated a—b in Figure 3 in which the test member 11 has a usual counter-sunk hole therein for test purposes. The portion 8 has a less sharp angle in order to accurately seat in the test hole, the portion 7 being blunt so as to shorten the tip and increase its strength. Due to the parallel motion of the two test points as hereinafter described, the points may not tilt or assume angular positions, and the contact is always along line a—b. It will be seen therefore that when the points are engaged with openings and pressed firmly in position the engagement with the test member will always be upon the line a—b under repeated tests. This is an important feature of this invention since it enables repeated tests to be made even by different operators and the engagement of the pin 4 with the holes in the test member will always be along the line a—b so that accurate readings of the gauge are always obtained. It will be understood that both of the points of the gauge are similarly constructed.

Adjacent its opposite end the casing 1 is provided with an opening 12 elongated slightly in the longitudinal axis of the casing, and the movable point 13 passes therethrough and is threaded into an accurately tapped hole in a movable member 14. Member 14 has a pin 15 upon which is freely pivoted a link 16. At its upper end link 16 is also pivoted on a pin 17 projecting from lug 18 on the casing 1. The pins 15 and 17 of the link 16 are accurately fitted in holes in the link to prevent any lost motion and to allow free swinging movement of the link.

Member 14 is provided with an accurately tapped hole to receive the threaded end of a rod 19 which extends longitudinally of the casing. Rod 19 is threaded at its opposite end into a bifurcated bracket member 21, locknuts 22 serving to secure the rod in accurately adjusted position. The threaded ends of rod 19 are preferably right and left hand threads to facilitate assembly. The rod 19 is preferably accurately machined from invar steel which has a very low temperature coefficient of expansion, so that changes in temperature have a negligible effect upon readings of the gauge. If desirable, certain nickel steels can be substituted for the invar steel which have a slight negative temperature coefficient of expansion.

The bifurcated bracket 21 is bent upwardly and passes on opposite sides of a swinging arm 23. As seen by the detail of Figure 2, the arm 23 has two conical openings drilled from opposite sides thereof and the bracket 21 has threaded openings in alignment with these conical openings for the reception of threaded pins 24. The pins 24 terminate in projecting pins 25 having rounded ends. By this construction a line-to-line contact is obtained between the conical holes in the bar 23 and the rounded ends of pins 25 so that the parts may pivot with respect to one another with substantially no friction. Any slight wear at these lines of engagement may readily be taken up by adjusting the threaded pins 24.

A block 28 secures a flat spring 27 to arm 23, the block 28 and spring 27 being positioned in a recess in the end of arm 23. Spring 27 is also secured to a lug on the casing 1 by the clamp block 29, the blocks 28 and 29 being held in position by machine screws. From an inspection of Figure 1 it will be seen that the upper edge of the arm 23 is closely adjacent the lower edge of the corner lug of casing 1 and clamp plate 29. By this construction the arm 23 always moves about a pivotal point which is the same under all conditions of use. If the spring 27 were free along a material portion of its length, the arm 23 might pivot about various points along the length of the spring. However, by the construction as shown, the pivot point of arm 23 is always the same, thereby giving absolutely correct reading of the strain gauge.

At its opposite end the arm 23 is provided with a spherical opening for the reception of a hardened steel spherical ball 31. The ball 31 engages against an absolutely flat portion 32 of a plunger 33 of the indicating instrument 34. The plunger 33 is preferably provided with rack teeth on one edge for engagement with one of the train of gears 35 to transmit motion of plunger 33 to the indicating pointer 36. Preferably plunger 33 is biased downwardly by a spring 37 built into the instrument. The instrument 34 is secured to the casing 1 by means of a bracket 38.

In order to maintain the parts in set position when the instrument is not being used, the arm 23 and the casing 1 are provided with openings for the reception of a tapered pin 41 which may be readily inserted in these openings to hold the arm 23 and the other parts of the strain gauge in accurate position during shipment.

The operation of the gauge as thus described is as follows: The specimen member to be tested is carefully prepared by having small countersunk drill holes made therein similar to those shown in Figure 3. The points 4 are then engaged in the drill holes and a reading is taken under no load. Then the specimen is placed under load and the points 4 again engaged with the test holes in order to accurately indicate the expansion or contraction of the specimen under the test load. Due to the parallel motion linkage, the points 4 always remain parallel and therefore the line of contact a—b (Figure 3) is always the same and errors cannot creep into the reading of the gauge due to inaccurate positioning of the gauge in the test holes. The movable point 13 takes up a new position in accordance with the expansion or contraction of the specimen. The parts are constrained to move in a parallel direction due to the parallel motion linkage provided by the pivoted link 16 at one end of the gauge, and the pivotal connection between pin 24 and the flat spring 27 at the other end of the gauge. The resultant motion of the movable point 13 is reflected in an oscillation of the bar 23 about the pivotal point of the leaf spring 27. This movement is amplified due to the long leverage of the bar 23. In the embodiment shown, the distance between the pins 15 and 17 of link 16 is exactly one inch and the distance between the pivotal point of the pin 24 and pivot point on spring 27 is also exactly one inch, and the distance from the center of the ball 31 to the pivot on spring 27 is exactly six inches. Thus the gauge as shown will give an amplified movement in a ratio of six to one of the movement of the movable point 13.

Due to the absolutely flat portion 32 of the plunger 33 engaging with the spherical surface of the hardened steel ball 31, an exact point of engagement is always maintained. The exact movement of the point 13 is reflected in a six to one amplified form on the plunger 33 of the instrument 34, and the amplification remains always the same even in extreme positions of the parts due to the spherical ball 31. The instrument 34 may further amplify this movement, dependent upon the type of instrument used. However, it will be noted that a definite and predetermined amplification is obtained in the strain gauge itself irrespective of the instrument associated therewith.

It will be understood that the invention is not limited in any respect to the instrument shown in connection therewith, since other forms of indicating instruments may be used to indicate the movements of the hardened ball 31. It will furthermore be understood that the dimensions as given, namely one inch between pins 15 and 17 and between pins 24 and point 27, and six inches between ball 31 and point 27 are illustrative only and not restrictive. It is contemplated that gauges in accordance with this invention can be manufactured in various sizes, some of the gauges being one or two inches long, these short gauges reducing any possible error due to buckling of the specimen under test. The principles of the invention will be the same irrespective of the size of the gauge manufactured.

Referring now to Figures 4 and 5 wherein a slightly modified form is illustrated, a similar casing 1 is provided, and the movable points 4 and 13 are similar in construction to those previously described. The movable point 13 is threaded into an opening in a floating link 41 which is pivoted to a stationary block 42 by a parallel motion linkage as follows. The link 41 and block 42 have openings 43 therein in which are positioned bent leaf springs 44 held in position by screws 45. These springs 44 engage against pins 46 which seat in V-shaped notches 47 in the link 41 and block 42. Pivoted on the two left hand pins 46 is a link 48, and pivoted on the two right hand pins 46 is the end of a bar 51.

It will be seen from the construction as thus far described that the movable link 41 is restrained to move in a parallel direction due to the parallel linkage arrangement, whereby the pin 13 must therefore move parallel to pin 4. The arm 51 extends longitudinally of the strain gauge as seen in Figure 4 and is provided with a seat at its opposite end for the reception of a hardened steel ball 52 similar to ball 31 of the prior modification. The ball 52 engages the flat end 53 of a rod 54 of the instrument 55. The strain gauge casing 1 is provided with two upwardly extending posts 56 having handles 57 secured thereto for using the strain gauge. As seen in Figure 5 the open side of the casing 1 is adapted to be closed by a cover 58 held in position by screws 59 which engage with the correspondingly threaded openings in the casing 1.

This embodiment of the invention operates substantially in the same manner as that previously described. The floating link 41 is constrained to move in a parallel direction and this movement is reflected by an oscillating movement of the arm 51 and this oscillating movement is amplified due to the long leverage provided by arm 51. In the embodiment shown, this movement is amplified in a six to one ratio, that is, the ball 52 multiplies the movement of oscillation of the linkage in a six to one ratio. Preferably a spring 60 engages the lower side of arm 51 and a portion of the casing 1 to assist in returning the parts to zero position, and to balance the spring in the instrument 55.

In both of the forms of the invention herein illustrated, it will be apparent that the movable parts of the mechanism are constrained to move in a direct parallel motion and that the movement thereof is greatly amplified by the construction of the movable mechanism itself. Furthermore all errors in reading due to the shifting of the point of engagement between the movable mechanism and the plunger of the instrument are eliminated due to the ball engaging at all times against a flat surface on the instrument. The entire mechanism of the gauge is housed in a substantially dust proof casing. The parts of the gauge are light in weight and yet sturdy in construction and once the parts are accurately assembled, the gauge will accurately indicate changes in size of a test specimen over long periods of use.

In the embodiment shown in Figures 4 and 5, the heat imparted to the strain gauge by the hands of the operator is prevented from reaching the operating parts thereof due to the fact that the handles 57 are spaced from the casing. It will be understood that similar handles may be used with the embodiment shown in Figures 1 to 3.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

What is claimed and desired to be secured by United States Letters Patent is:—

1. A strain gauge comprising a casing, two gauge points adapted to be engaged with the member to be tested, one of said gauge points being fixed to said casing, a movable member within said casing carrying the other gauge point, a plurality of links pivoted to said casing and to said movable member and allowing the gauge point carried by said movable member to move parallel to the fixed gauge point, one of said links having an extension, and an indicating instrument having a movable plunger engaging the extension of said link whereby movement of said gauge point and said link is multiplied and indicated on said instrument.

2. The invention as defined in claim 1 wherein the engaging portions of said plunger and the extension of said link comprise one substantially spherical surface and one flat surface.

3. The invention as defined in claim 1 wherein the extension on said link has a spherical surface engaging a flattened part on said plunger.

4. A strain gauge comprising a casing, two gauge points adapted to be engaged with the piece to be tested, one of said gauge points being fixed to said casing, a movable member within the casing carrying the other gauge point, a link pivoted to said casing and said member, a rod secured to said member at one end, a link pivotally secured to the other end of said rod, means pivotally mounting said last-named link to said casing, said last-named link having an extended arm, and an indicating instrument for indicating movements of said extended arm.

5. The invention as defined in claim 4 wherein said means pivotally mounting said last-named link to said casing comprises a flat spring.

6. A strain gauge comprising a casing, a gauge point fixed to said casing, a movable member in said casing carrying a movable gauge point, a pair of parallel links pivoted to said member and said casing, one of said links having an arm extending longitudinally within the casing, and an indicating instrument secured to said casing and having a plunger engaging the end of said arm.

7. The invention as defined in claim 6 wherein said movable member is provided with V notches, and said links have substantially circular pins engaged in said notches.

8. A strain gauge comprising a casing, two gauge points adapted to be engaged with the piece to be tested, said points having two adjacent conical surfaces of different angles with respect to the axis of the point, the surface having the lesser angle being adapted for engagement with the edge of the recess in the member to be tested, one of said points being fixed to said casing, a movable member within the casing carrying the other point, a link pivoted to said casing and said member, a rod secured to said member at one end, a link pivotally secured to the other end of said rod, means pivotally mounting said last named link to said casing, said last named link having an extended arm, and an indicating instrument for indicating the movement of said extended arm.

9. A strain gauge comprising a casing, a gauge point fixed to said casing, a movable member in said casing carrying a movable point, said points each having two adjacent conical surfaces of different angles with respect to the axis of the point, the surface having the lesser angle being adapted for engagement with the edge of the recess in the member to be tested, said movable member being provided with V-notches, a pair of parallel links pivoted to said casing and having substantially circular pins pivotally engaged in said V-notches, one of said links having an arm extending longitudinally within the casing, and an indicating instrument secured to said casing and having a plunger engaging the end of said arm.

10. A strain gauge comprising a casing, two gauge points adapted to be engaged with the member to be tested, one of said gauge points being fixed to said casing, a movable member with slight temperature coefficient of expansion within said casing carrying the other gauge point, links pivoted to said casing and to said movable member limiting the gauge point carried by said movable member to move parallel to the fixed gauge point, one of said links having an extension, and an indicating instrument having a movable plunger engaging the extension of said link whereby movement of said gauge point and said link is multiplied and indicated on said instrument.

GRANT A. DE SHAZER.
LOUIS W. BAUER.